United States Patent
Nam et al.

(10) Patent No.: US 7,599,310 B2
(45) Date of Patent: Oct. 6, 2009

(54) APPARATUS AND METHOD FOR MANAGING QUALITY OF A LABEL SWITCHED PATH IN A CONVERGENCE NETWORK

(75) Inventors: Hyun Soon Nam, Seoul (KR); Eun Young Cho, Daejeon (KR); Byung Ho Yae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 748 days.

(21) Appl. No.: 11/300,189

(22) Filed: Dec. 13, 2005

(65) Prior Publication Data

US 2006/0155532 A1 Jul. 13, 2006

(30) Foreign Application Priority Data

Dec. 14, 2004 (KR) ................ 10-2004-0105784
May 17, 2005 (KR) ................ 10-2005-0041293

(51) Int. Cl.
*H04J 3/14* (2006.01)
*H04L 12/26* (2006.01)
*H04L 12/56* (2006.01)

(52) U.S. Cl. ............. 370/252; 370/236.2; 370/395.21

(58) Field of Classification Search .......... 370/389, 370/236.2, 395.21, 252
See application file for complete search history.

(56) References Cited

U.S. PATENT DOCUMENTS

| 7,012,919 | B1* | 3/2006 | So et al. ............. 370/392 |
| 7,373,401 | B1* | 5/2008 | Azad ................ 709/224 |
| 7,486,622 | B2* | 2/2009 | Regan et al. .......... 370/236 |
| 2005/0207347 | A1* | 9/2005 | Ishinishi et al. ....... 370/241 |
| 2005/0232157 | A1* | 10/2005 | Tyan et al. ........... 370/237 |
| 2005/0271060 | A1* | 12/2005 | Kodialam et al. ...... 370/394 |
| 2006/0039364 | A1* | 2/2006 | Wright ............... 370/352 |

FOREIGN PATENT DOCUMENTS

| KR | 1020030054445 A | 7/2003 |
| KR | 1020030064041 A | 7/2003 |

OTHER PUBLICATIONS

Brunner, M. et al., "Management using Policies," IEEE Session Fourteen, Policy-Based Management, 2001, 14 pages.

* cited by examiner

*Primary Examiner*—Alpus H Hsu
*Assistant Examiner*—Saad Hassan
(74) *Attorney, Agent, or Firm*—Blakely, Sokoloff, Taylor & Zafman LLP

(57) ABSTRACT

Provided are an apparatus and method for managing quality of a multi protocol label switching (MPLS) label switched path (LSP), which has been previously established in a convergence network. The apparatus for managing quality of a LSP includes: LSP provisioning/releasing means for provisioning and releasing the LSP in a convergence network; and LSP quality management means for measuring the quality of the LSP on the basis of performance information received from the each node through which the LSP passes, wherein the LSP quality management means transmits alert information to the LSP provisioning/releasing means, when the measured quality of the LSP deviates from a predetermined performance threshold, so that the LSP is readjusted.

9 Claims, 2 Drawing Sheets

APPARATUS AND METHOD FOR MANAGING QUALITY OF A LABEL SWITCHED PATH IN A CONVERGENCE NETWORK

CROSS-REFERENCE TO RELATED APPLICATION

This application claims priority to and the benefit of Korean Patent Application Nos. 2004-105784, filed on Dec. 14, 2004 and 2005-41293, filed on May 17, 2005, the disclosures of which are incorporated herein by reference in their entirety.

BACKGROUND

1. Field of the Invention

The present invention relates to an apparatus and method for managing quality of a MPLS (Multi-Protocol Label Switching)-based label switched path (LSP), which has been previously established in a convergence network and, more particularly, to an apparatus and method for reestablishing the LSP or performing bandwidth adjustment by analyzing quality of the LSP using an MPLS OAM (Operation, Administration and Management) packet and packet statistic information and determining whether the quality of the LSP is appropriate for requirement or network policy or not.

2. Discussion of Related Art

Typically, a separate system from router or management system, which performs sampling performance information of each LSP, is required to poll and filter the performance information and it takes a long time to report the performance information to a top-level network management or service management system and reflect the performance information to the actual LSP.

According to another conventional art, the quality of the LSP is measured by fragmentarily polling statistic information instead of polling the performance information periodically and measuring the quality of all LSPs. Thus, there is a problem in that it is impossible to continuously perform quality management and the measurement result is fragmentarily reflected.

SUMMARY OF THE INVENTION

The present invention is directed to an apparatus and method for managing quality of an LSP by analyzing edge-to-edge quality information of the LSP through an MPLS OAM packet analysis and by polling LSP statistic information from each node through which the LSP passes in the convergence network.

The present invention is also directed to an apparatus and method for reestablishing the LSP, which satisfies the network policy, by setting a threshold value appropriate for a network policy and informing the provisioning/releasing of the LSP if the quality of the LSP deviates from the threshold value.

One aspect of the present invention is to provide an apparatus for managing quality of a label switched path (LSP), comprising: provisioning/releasing LSP means for provisioning and releasing the LSP in a convergence network; and LSP quality management means for measuring the quality of the LSP on the basis of performance information received from each node through which the LSP passes, wherein said LSP quality management means transmits the alert information to LSP provisioning/releasing means, when the measured quality of the LSP deviates from a predetermined performance threshold, the LSP is readjusted.

The LSP quality management means may include MPLS OAM packet analysis means for measuring the quality of the LSP using a multi protocol label switching operation and management (MPLS OAM) packet which is generated in the ingress node of the LSP and transmitted to an egress node of the LSP and LSP statistic information analysis means for periodically polling LSP statistic information from the each node through which the LSP passes and measuring the quality of the LSP based on the polled LSP statistic information.

Another aspect of the present invention is to provide a method for managing quality of a label switched path (LSP) in a convergence network management system, comprising the steps of: determining whether the LSP uses a MPLS OAM packet or not; periodically polling the MPLS OAM packet from an egress node of the LSP to measure the quality of the LSP when it is determined that the LSP uses the MPLS OAM packet; periodically polling statistic information from the each node through which the LSP passes to measure the quality of the LSP when it is determined that the LSP does not use the MPLS OAM packet; and readjusting the LSP when the measured quality of the LSP deviates from a predetermined performance threshold.

The measured quality of the LSP may be expressed in at least one of currently used packet amount information and dropped packet amount information of the LSP.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Hereinafter, an exemplary embodiment of the present invention will be described in detail. However, the present invention is not limited to the embodiments disclosed below, but can be implemented in various types. Therefore, the present embodiment is provided for complete disclosure of the present invention and to fully inform the scope of the present invention to those ordinarily skilled in the art.

Figure 1:
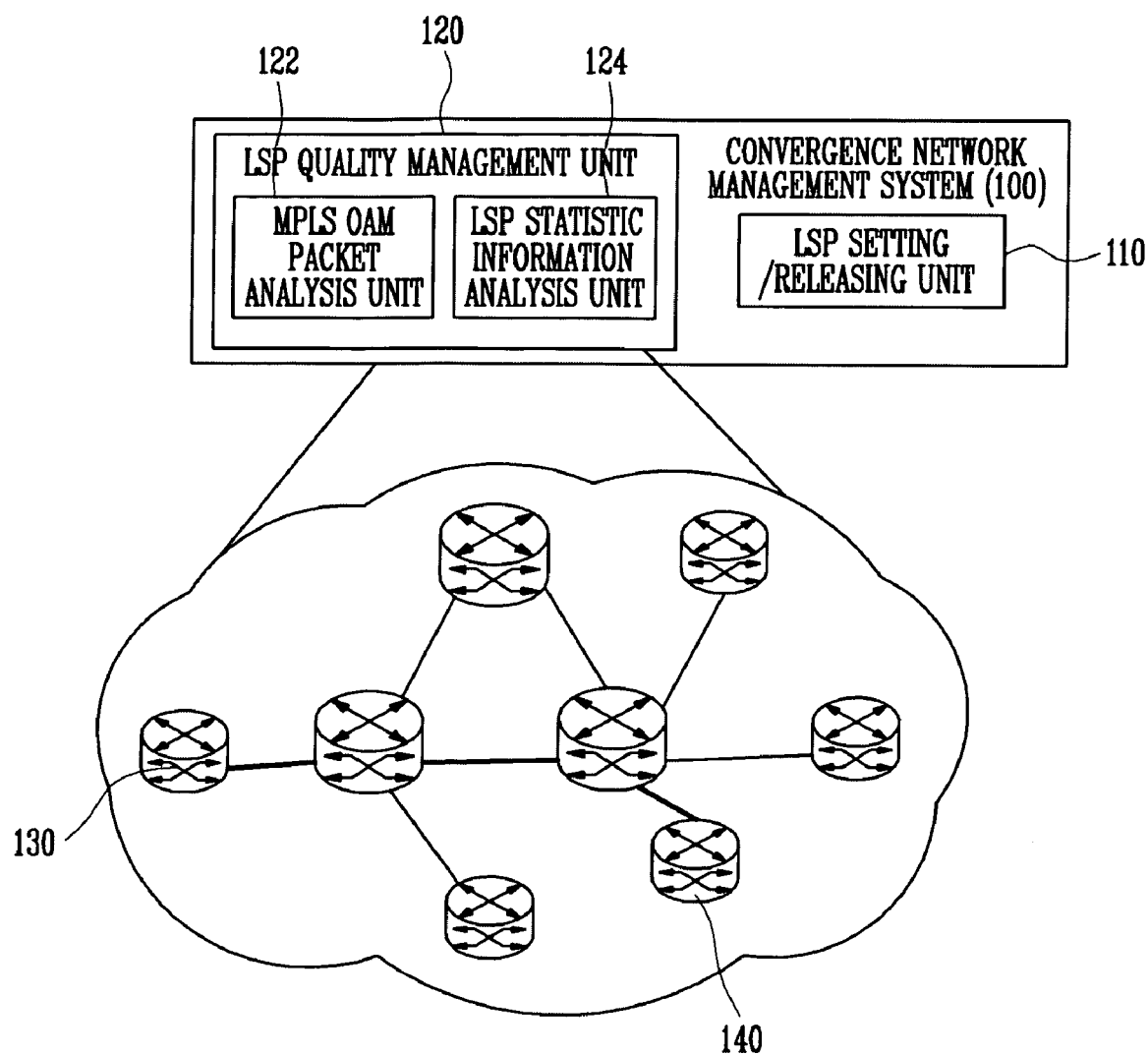
FIG. 1 is a schematic diagram of a convergence network management system to which LSP quality management of the present invention may be applied.

FIG. 1 is a schematic diagram of a network management system for convergence network that the LSP quality management of the present invention may be applied. As shown in FIG. 1, the convergence network management system 100 includes an LSP provisioning/releasing unit 110 for provisioning and releasing the LSP, and an LSP quality management unit 120 for measuring and analyzing quality of the LSP. The LSP quality management unit 120 analyzes the quality of an LSP and informs the LSP provisioning/releasing unit 110 that it is not appropriate for the given network policy, e.g., allocated bandwidth or delay quality, so that the LSP provisioning/releasing unit 110 can re-establish and re-optimize the LSP or increase the bandwidth to maintain quality appropriate for the network policy.

The LSP quality management unit 120 includes an MPLS OAM packet analysis unit 122 and an LSP statistic information analysis unit 124.

The MPLS OAM packet analysis unit 122 analyzes edge-to-edge performance of the LSP using an MPLS OAM packet, which is periodically received from an ingress node 130 or an egress node 140 of the LSP. An operator sets performance threshold information of the LSP appropriate for the network policy, such as a performance information observation time, a period of polling performance information, e.g., per fifteen-minutes and per day, based on the transmission standard, and selects an OAM packet type, e.g., a type for transmitting a connectivity verification packet ("cv packet") at every second and the other type for transmitting the cv packet at every 20 m second.

The MPLS OAM packet containing time stamp information is generated and transmitted from an ingress node 130 of the LSP and received and managed in the egress node 140, and the MPLS OAM packet analysis unit 122 polls the MPLS OAM packet periodically, per fifteen-minutes and per day, based on the transmission standard. The operator can select/un-select some LSPs to be applied MPLS OAM, and can set the threshold information and OAM packet type according to the network operating policy for the LSP applied MPLS OAM. The MPLS OAM packet analysis unit 122 manages information set by operator. The corresponding OAM packet type and the provisioning information of the OAM may be transmitted to an MPLS OAM function block inside the ingress node of LSP, and the duration time of performance information and the packet transmission delay threshold information may be transmitted to an MPLS OAM function block inside the egress node of LSP. The MPLS OAM function block in the egress node measures the LSP quality using the time stamp value of the MPLS OAM packet. If this value deviates from the previously predetermined performance threshold, the MPLS OAM function block in the egress node generates a performance threshold alert and transmits it to the MPLS OAM packet analysis unit 122 of the management system, and the MPLS OAM packet analysis unit analyzes it. According to the analysis result, the LSP provisioning/releasing unit 110 can modify or re-establish the LSP.

Even though the LSP quality information does not exceed the threshold in a moment so threshold alert does not happen, MPLS OAM packet analysis unit 122 analyzes if it is determined as not appropriate for an availability policy in a long-term perspective. According to the result, the LSP provisioning/releasing unit 110 can modify or re-establish the LSP.

The LSP statistic information analysis unit 124 can measure the LSP quality using the statistic information received from each node through which the LSP passes. The operator sets the LSP statistic threshold information, such as the number and size of packets and the number and size of dropped packets, which are appropriate for the policy. The LSP statistic information analysis unit 124 polls the LSP statistic information periodically, for example, per 15-minutes and per day, based on the transmission standard, from each node through which the LSP passes and analyzes it to measure the LSP quality. If the quality of the previously provisioned LSP is not appropriate for the policy, the LSP provisioning/releasing unit 124 is informed of this fact so that the work appropriate for the policy can be processed.

Figure 2:
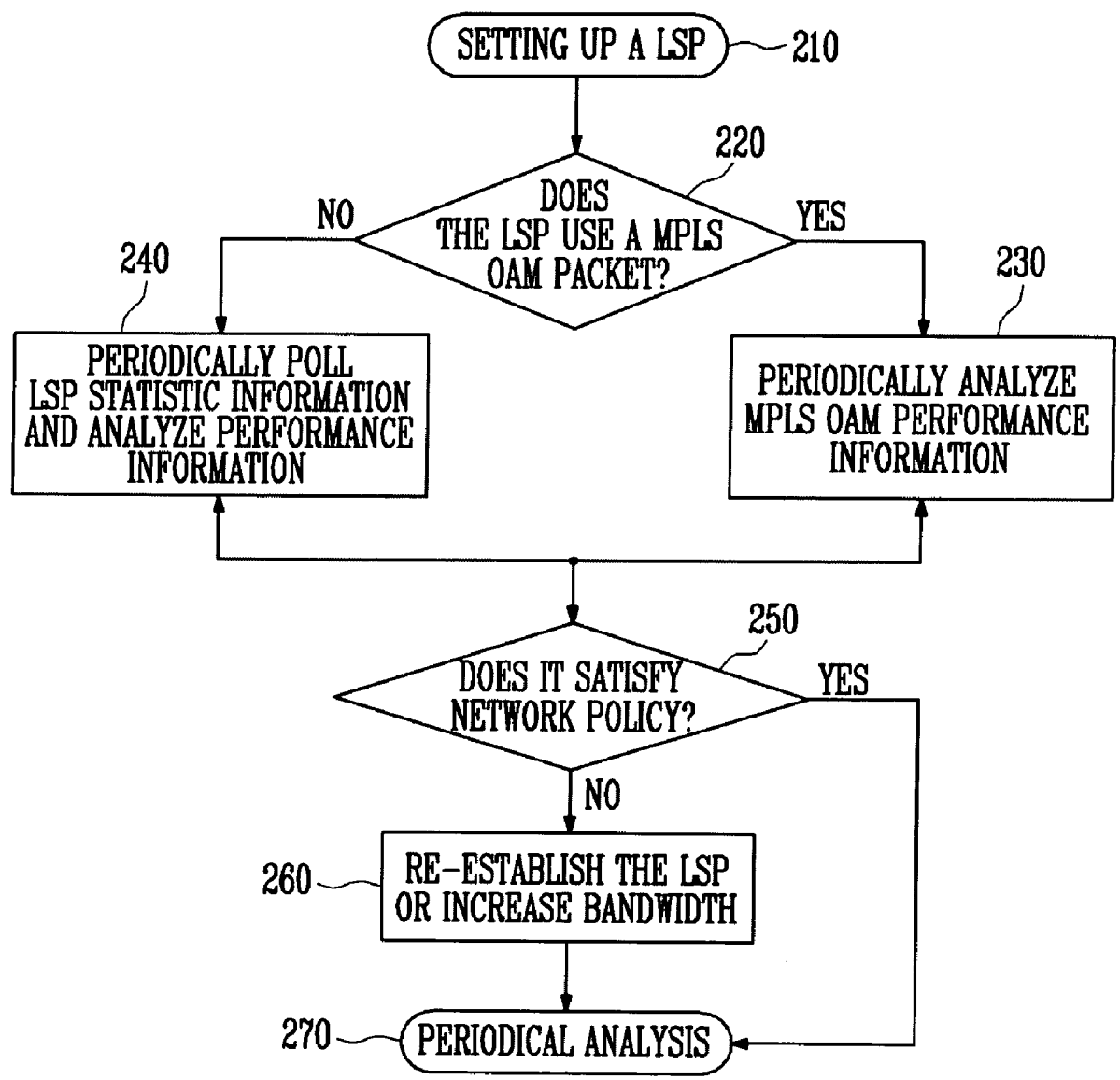
FIG. 2 is a flow chart illustrating a method for managing quality of the LSP according to an embodiment of the present invention.

FIG. 2 is a flow chart illustrating a method for managing the quality of the LSP according to an exemplary embodiment of the present invention. As shown in FIG. 2, after the $LSP_k$ is has been established (step 210), it is determined whether the $LSP_k$ uses an MPLS OAM packet or not (step 220). If it is determined that the $LSP_k$ uses the MPLS OAM packet, the MPLS OAM packet performance analysis unit 122 analyzes the performance of the $LSP_k$ using the MPLS OAM packets, which are received periodically.

As a result of the determination, if the $LSP_k$ does not use the MPLS OAM packet, the LSP statistic information analysis unit 124 polls the LSP statistic information periodically from each node through which the corresponding $LSP_k$ passes to, thereby analyze the performance of the $LSP_k$. In this embodiment, currently used packet amount, i.e., utilization information, $U^{LSPk}$ of the $LSP_k$ and dropped packet amount information $D^{LSPk}$ of the $LSP_k$ can be calculated. The $U^{LSPk}$ of the $LSP_k$ is the availability information in a long-term perspective and can be used in the Volume-Rate Internet Collection System. The $U^{LSPk}$ of the $LSP_k$ can be calculated by Equation 1:

$$U^{Lsp_k} = \frac{\sum_{i=0}^{cnt}\left(nP_i^{Lsp_k}\right)}{T_{(p)} * cnt}$$

where, cnt denotes a hop count, $nP_i^{LSPk}$ denotes the number and size of the packets at the i-th node through which the $LSP_k$ passes, and $T_{(P)}$ denotes a measuring time.

Similarly, the dropped packet amount information $D^{LSPk}$ of the $LSP_k$ can provide an index for adjusting a bandwidth together with $U^{LSPk}$. If a large amount of packets are dropped, it can induce to increase the bandwidth. The dropped packet amount information $D^{LSPk}$ of the $LSP_k$ can be calculated by Equation 2:

$$U^{Lsp_k} = \frac{\sum_{i=0}^{cnt}\left(nP_i^{Lsp_k}\right)}{T_{(p)} * cnt}$$

where, $nD_i^{LSPk}$ denotes the number and size of the dropped packets at the i-th node through which the $LSP_k$ passes.

Then, it is determined whether the performance information analyzed at the step 230 or the step 240 satisfies the network policy or not (step 250). If it does not satisfy the network policy, the LSP may be reestablished, or the bandwidth may be increased (step 260). Even though the performance information of the $LSP_k$ satisfies the network policy, the quality of the LSP appropriate for the network policy is maintained through the periodical analysis (step 270).

As described herein before, according to the present invention, the quality of the LSP can be managed through the periodical MPLS OAM performance information analysis and LSP statistic information analysis, and since the threshold is set to induce the quality appropriate for the network policy, it is possible to control the convergence network management more efficiently. Further, the present invention has the following advantages.

First, the quality of the LSP can be guaranteed in the convergence network even by the minimum equipment addition.

Second, more cellularized service can be provided since an accounting policy can be efficiently provided using the statistic information.

Third, it is easy to perform the network management since it is dynamically interworking with the network policy service.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. An apparatus for managing quality of a label switched path (LSP), comprising:

LSP provisioning/releasing means for provisioning and releasing the LSP in a convergence network; and LSP quality management means for measuring the quality of the LSP on the basis of performance information received from each node through which the LSP passes, wherein said LSP quality management means transmits alert information to said LSP provisioning/releasing means, when the measured quality of the LSP deviates from a predetermined performance threshold, so that the LSP is readjusted, wherein the measured quality of the LSP is expressed in at least one of currently-used packet amount information and dropped packet amount information of the LSP, and wherein the currently-used packet amount information of the LSP ($U^{LSPk}$) is calculated by the following equation, where k is an identifier of an LSP, cnt denotes a hop count, $nP_i^{LSPk}$ denotes the number and size of the packets at the i-th node through which the $LSP_k$ passes, and $T_{(P)}$ denotes a measuring time:

$$U^{Lsp_k} = \frac{\sum_{i=0}^{cnt}(nP_i^{Lsp_k})}{T_{(p)}^* cnt}.$$

2. The apparatus of claim 1, wherein said LSP quality management means includes:

MPLS (Multi-Protocol Label Switching) OAM (Operation, Administration and Management) packet analysis means for measuring the quality of the LSP using the MPLS OAM packet, said MPLS OAM packet being generated from an ingress node of the LSP and then transmitted to an egress node of the LSP; and LSP statistic information analysis means for periodically polling LSP statistic information from the each node through which the LSP passes and measuring the quality of the LSP based on the polled LSP statistic information.

3. The apparatus of claim 2, wherein the MPLS OAM packet is periodically transmitted from the egress node to said MPLS OAM packet analysis means.

4. The apparatus of claim 2, wherein the LSP statistic information periodically polled from the each node contains the number and size of packets of the each node and the number and size of dropped packets.

5. A method for managing quality of a label switched path (LSP) in a convergence network management system, the method comprising the steps of:

determining whether the LSP uses a MPLS (Multi-Protocol Label Switching) OAM (Operation, Administration and Management) packet or not;

periodically polling the MPLS OAM packet from an egress node of the LSP to measure the quality of the LSP, when it is determined that the LSP uses the MPLS OAM packet;

periodically polling statistic information from the each node through which the LSP passes to measure the quality of the LSP, when it is determined that the LSP does not use the MPLS OAM packet; and readjusting the LSP when the measured quality of the LSP deviates from a predetermined performance threshold, wherein the measured iuality of the LSP is expressed in at least one of currently-used packet amount information and dropped packet amount information of the LSP, and wherein the currently-used packet amount information of the LSP ($U^{LSPk}$) is calculated by the following equation, where k is an identifier of an LSP, cnt denotes a hop count, $nP_i^{LSPk}$ denotes the number and size of the packets at the i-th node through which the $LSP_k$ passes, and $T_{(P)}$ denotes a measuring time:

$$U^{Lsp_k} = \frac{\sum_{i=0}^{cnt}(nP_i^{Lsp_k})}{T_{(p)} * cnt}.$$

6. The method of claim 5, wherein the period of polling the MPLS OAM packet and the LSP statistic information is 15 minutes.

7. The method of claim 5, wherein the LSP statistic information periodically polled from the each node contains the number and size of packets of the each node and the number and size of dropped packets.

8. The method of claim 5, wherein the readjustment of the LSP is performed by re-establishing the LSP or increasing bandwidth.

9. The method of claim 5, the dropped packet amount information of the LSP($D^{LSPk}$) is calculated by the following equation, where $nD_i^{LSPk}$ denotes the number and size of the dropped rackets at the i-th node through which the $LSP_k$ passes:

$$D^{Lsp_k} = \sum_{i=0}^{cnt} nD_i^{Lsp_k}.$$

* * * * *